US006957834B2

(12) United States Patent
Maeda

(10) Patent No.: US 6,957,834 B2
(45) Date of Patent: Oct. 25, 2005

(54) THREADED JOINT FOR PIPES

(75) Inventor: Jun Maeda, Ashiya (JP)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 228 days.

(21) Appl. No.: 10/626,638

(22) Filed: Jul. 25, 2003

(65) Prior Publication Data

US 2004/0217592 A1 Nov. 4, 2004

Related U.S. Application Data

(63) Continuation of application No. PCT/JP02/07053, filed on Jul. 11, 2002, now abandoned.

(30) Foreign Application Priority Data

Jul. 13, 2001 (JP) .................................... 2001-213469

(51) Int. Cl.$^7$ ............................................. F16L 25/00
(52) U.S. Cl. ..................... 285/333; 285/334; 285/390; 285/917
(58) Field of Search .............................. 285/333, 334, 285/355, 390, 917

(56) References Cited

U.S. PATENT DOCUMENTS

| | | | | |
|---|---|---|---|---|
| 3,870,351 A | * | 3/1975 | Matsuki | 285/334 |
| 4,623,173 A | | 11/1986 | Handa et al. | |
| 4,692,988 A | | 9/1987 | Shulver et al. | |
| 4,732,416 A | | 3/1988 | Dearden et al. | |
| 4,736,967 A | * | 4/1988 | Mott et al. | 285/94 |
| 4,770,444 A | * | 9/1988 | Hauk | 285/55 |
| 4,958,862 A | * | 9/1990 | Cappelli et al. | 285/334 |
| 5,137,310 A | | 8/1992 | Noel et al. | |
| 5,423,579 A | | 6/1995 | Blose et al. | |
| 5,498,035 A | * | 3/1996 | Blose et al. | 285/94 |
| 6,045,165 A | * | 4/2000 | Sugino et al. | 285/333 |
| 6,349,979 B1 | * | 2/2002 | Noel et al. | 285/333 |
| 6,746,057 B2 | * | 6/2004 | Goto et al. | 285/333 |
| 6,789,823 B2 | * | 9/2004 | Sches et al. | 285/333 |
| 2004/0021314 A1 | * | 2/2004 | Pina et al. | 285/94 |
| 2004/0262919 A1 | * | 12/2004 | Dutilleul et al. | 285/333 |

FOREIGN PATENT DOCUMENTS

| | | |
|---|---|---|
| EP | 0 364 413 A1 | 9/1989 |
| EP | 0 786 616 A1 | 7/1997 |
| EP | 0 916 883 A1 | 5/1999 |
| JP | 63-9794 | 6/1986 |
| JP | 61-124792 | 6/1986 |
| JP | 06-010154 | 1/1994 |
| JP | 07-217777 | 8/1995 |
| JP | 08-145248 | 6/1996 |
| JP | 09-072467 | 3/1997 |
| JP | 2001-065752 | 3/2001 |
| WO | 01/48411 | 7/2001 |

* cited by examiner

*Primary Examiner*—James M. Hewitt
(74) *Attorney, Agent, or Firm*—Clark & Brody

(57) ABSTRACT

A threaded joint which economically imparts effective sealing properties to a metal-to-metal seal portion and which can prevent seizing at the time of make-up comprises a steel pipe 1 having at its tip a male thread 1$b$ and an unthreaded sealing surface 1$a$, and a coupling 2 having on its inner surface a female thread 2$b$ and an unthreaded sealing surface 2$a$. With the yield pressure of the inner surface of the pipe being Py, (1) the average pressure Pm of the annular contact portion satisfies Pm/Py≧3, and the width in the axial direction of the portion which receives a pressure Ps which satisfies Ps/Py≧1 in the annular contact portion is at least 1 mm (or at least 2 mm), and the surface roughness Ry of both unthreaded sealing surfaces is at most 25 $\mu$m (or at most 30 $\mu$m), or (2) the relationship between the average pressure Pm of the annular contact portion and the surface roughness Ry ($\mu$m) of the unthreaded sealing surface satisfies Pm/Py≧0.0032×Ry$^2$+1.0, and the width in the axial direction of the portion which receives a pressure Ps which satisfies Ps/Py≧1 in the annular contact portion is at least 1 mm.

6 Claims, 5 Drawing Sheets

THREADED JOINT FOR PIPES

This is a continuation of international application PCT/JP02/07053, with an international filing date of Jul. 11, 2002 which is now abandoned.

TECHNICAL FIELD

This invention relates to a threaded joint for pipes which has a metal-to-metal seal portion and which is for use with oil well pipes used in the development, production, and transport of petroleum and natural gas, for example.

BACKGROUND ART

The conditions of use of joints for connecting oil well pipes used in the development and production of petroleum and natural gas are becoming more severe as oil wells and gas wells become deeper, and a higher level of performance is required thereof with respect to strength and airtightness (also referred to below as sealing properties).

In such wells, with threaded tubular joints such as buttress joints or round thread joints which have conventionally been used in which joining is performed solely by threaded engagement of API standard threads, it is not possible to provide either strength or sealing properties adequately.

Therefore, special tubular joints have been proposed which have a metal-to-metal seal portion and which have adequate joint strength and excellent airtightness, and these have come to be actually used.

For example, U.S. Pat. No. 4,732,416 proposes a threaded joint for pipes which can avoid stress concentrations by forming a metal-to-metal seal portion with a shape in which a curved surface contacts a curved surface.

U.S. Pat. No. 4,623,173 proposes a threaded joint for pipes in which a sealing surface on the male thread side of a metal-to-metal seal portion is specified as a convex surface having a radius of curvature of at least 100 mm, and a sealing surface on the female thread side is specified as a sloping surface (a conical surface) having a taper angle of 1.0–4.7°, and the pressure P applied to the metal-to-metal contact portion of the sealing surface (referred to below simply as the "contact portion") is specified as (the internal pressure applied to the threaded joint)<P<(the yield strength of the material of the threaded joint).

U.S. Pat. Nos. 5,137,310 and 5,423,579 propose threaded joints for pipes in which a metal-to-metal seal portion has a shape in which a conical surface contacts a conical surface.

In JP A 61-124792, a threaded joint for pipes is proposed in which the surface roughness (Ry) of one sealing surface of a metal-to-metal seal portion is specified as 5–25 µm Rmax.

JP A 06-10154 proposes a threaded joint for pipes having a metal-to-metal seal portion which has been subjected to surface treatment to form a surface treatment coating with a thickness satisfying a prescribed relationship with the surface roughness (Ry) (within the range of 5–20 µm) of a substrate.

JP A 07-217777 proposes a threaded joint which aims at improving resistance to seizing (including galling) by making the thickness of a surface treatment coating formed on a metal-to-metal seal portion greater than the surface roughness Rmax (Ry) of a substrate.

JP A 08-145248 proposes a threaded joint of high Cr steel containing at least 10 mass % of Cr in which the surface hardness of one sealing surface of a metal-to-metal seal portion is made at least 10 Hv larger than that of the other sealing surface, and the average roughness of the surface having the higher hardness is made to be in the range of 0.25–1.00 µm.

However, even with special threaded joints having a metal-to-metal seal portion as described above, if the surface roughness of the sealing surface is large, leaks can easily occur. In particular, when the fluid is a gas as with a gas well, it becomes easy for leaks to occur. Therefore, the pressure which it is necessary to apply to the contact portions of the sealing surfaces in order to prevent leaks when the surface roughness is large becomes high. Depending on the state of contact of the sealing surfaces or the conditions of the applied load, it is not possible to apply a sufficient pressure to the sealing surfaces, and the joints may not exhibit desired sealing properties.

With tubular joints having a metal-to-metal seal portion, it should be possible to obtain good sealing properties by reducing the surface roughness of the sealing surfaces and increasing the pressure applied to the contact portions. However, reducing the surface roughness requires a high working accuracy, working time becomes long, and losses from the standpoint of working efficiency and costs become large. On the other hand, when the contact force applied to the seal portion is increased, the pressure becomes high if the width of the contact portions is narrow, and it becomes easy for seizing to take place, leading to damage of the joint.

However, none of the above-described threaded joints having a metal-to-metal seal portion takes into consideration the relationship of the surface roughness and the applied pressure to sealing properties.

For example, the tubular joints for pipes proposed in U.S. Pat. Nos. 4,732,416; 4,623,173; 5,137,310 and 5,423,579 contain no mention of the surface roughness of a sealing surface or the applied pressure.

On the other hand, with each of the threaded joints for pipes described in JP A 61-124792, JP A 06-10154, JP A 07-217777, and JP A 08-145248, the surface roughness is prescribed in the relationship with the surface treatment, and there is no mention of the relationship between the surface roughness and the applied pressure and the width of the contact portion, or of the relationship between these and the sealing properties.

Thus, with special threaded joints having a metal-to-metal seal portion which have been proposed up to now, it was difficult to prevent problems such as seizing or the leakage of fluids with certainty.

DISCLOSURE OF THE INVENTION

The present inventors found that the above-described problems of special threaded joint are caused by the relationships of the surface roughness of the sealing surface with the applied pressure and with the width in the axial direction of the contact portion on which pressure is acting in the sealing surface, and that by optimizing these relationships, it is possible to economically impart good sealing properties to a tubular joint having a metal-to-metal seal portion.

The present invention relates to a threaded joint for pipes having a metal-to-metal seal portion and comprising a male thread and an unthreaded sealing surface formed on an end of a steel pipe, and a female thread and an unthreaded sealing surface which are formed on the inner surface of a coupling, the female thread threadingly engaging with the male thread and the unthreaded sealing surface of the coupling abutting against the sealing surface of the steel pipe and forming an annular contact portion. A threaded joint for pipes according to the present invention is characterized by one of the following (1)–(3), with the yield pressure of the inner surface of the pipe being Py:

(1) The surface roughness Ry of the unthreaded sealing surfaces of the steel pipe and the coupling is at most 25 μm, and upon make-up of the threaded joint, a metal-to-metal seal portion can be formed in which the average pressure Pm of the annular contact portion satisfies Pm/Py≧3, and the width in the axial direction of the portion which receives a pressure Ps which satisfies Ps/Py≧1 in the annular contact portion is at least 1 mm;

(2) Upon make-up of the threaded joint, for the unthreaded sealing surface of both the steel pipe and the coupling, the relationship between the average pressure Pm of the annular contact portion and the surface roughness Ry (μm) of the sealing surfaces satisfies Pm/Py≧0.0032×Ry$^2$+1.0, and the width in the axial direction of the portion which receives a pressure Ps which satisfies Ps/Py≧1 in the annular contact portion is at least 1 mm; and (3) The surface roughness Ry of the unthreaded sealing surfaces of the steel pipe and the coupling is at most 30 μm, and upon make-up of the threaded joint, a metal-to-metal seal portion can be formed in which the average pressure Pm of the annular contact portion satisfies Pm/Py≧3, and the width in the axial direction of the portion which receives a pressure Ps which satisfies Ps/Py≧1 in the annular contact portion is at least 2 mm.

Preferably, the steel pipe has a shoulder portion on its end surface, and correspondingly the coupling also has a shoulder portion which abuts the shoulder portion of the end surface of the steel pipe.

In the present invention, the surface roughness Ry of the unthreaded sealing surfaces means the worked surface roughness of the steel base material making up the threaded joint. Accordingly, in the case of a threaded joint which has been subjected to surface treatment, Ry is not the roughness of the surface treatment coating on the sealing surface but is the surface roughness of the sealing surface before surface treatment is carried out.

The pressure Ps applied to the annular contact portion means the force per unit area applied in the direction normal to the sealing surface, and the width in the axial direction of the annular contact portion which receives the pressure is a length measured along the sealing surface. Namely, the direction of the pressure Ps and the axial direction of the annular contact portion are perpendicular to each other.

The pressure Ps is applied by threaded engagement of the threads of the steel pipe and the coupling to make up the threaded joint. The value of the pressure Ps is determined by the dimensions and shape of the threads and sealing surfaces which are worked to within a predetermined range and on a predetermined amount of threaded engagement of the threads. Setting of the amount of threaded engagement is normally carried out either by detecting torque shoulders or by positioning by means of appropriate markings.

Ps/Py indicates the ratio of the pressure Ps of the contact portions to the Von Mises internal yield pressure Py and is a dimensionless value. Py is considered to be the maximum internal pressure which can be applied to a pipe, so if Ps/Py≧1, the pressure is always greater than or equal to the internal pressure. In a threaded joint for pipes according to the present invention, a value of Ps satisfying Ps/Py≧1 is specified as the effective pressure, and in the annular contact portion which forms the metal-to-metal seal portion, the width in the axial direction of the portion which receives this effective pressure is specified as being at least 1 mm or at least 2 mm, as described above.

The average pressure Pm is a value obtained by dividing the integral of the axial direction pressure distribution in the annular contact portion along the length in the axial direction of the contact portion (the length of the pressure distribution) by the length of contact. It is the pressure assuming that a uniform pressure acts along the length of the contact portion. Although the value of Pm would be able to be determined by pressure measurements, it can be determined by analysis using the finite element method (FEM) of the stress distribution state of the joint portion upon threaded engagement using data on the measured dimensions of the joint portion and the material properties.

The width in the axial direction of the contact portion which receives a pressure Ps satisfying Ps/Py≧1 can also be determined by the finite element method.

EMBODIMENTS OF THE INVENTION

The present inventors investigated the relationship of the surface roughness of the sealing surface, the pressure, and the width in the axial direction of the annular contact portion which receives the pressure to sealing properties for a metal-to-metal seal portion of a threaded joint by the following method.

Figure 1:
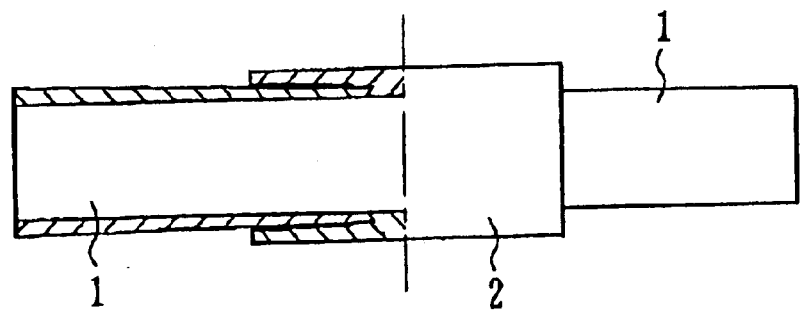
FIG. 1 is a schematic assembly view of a threaded joint for pipes having a metal-to-metal seal portion.
Figure 2:
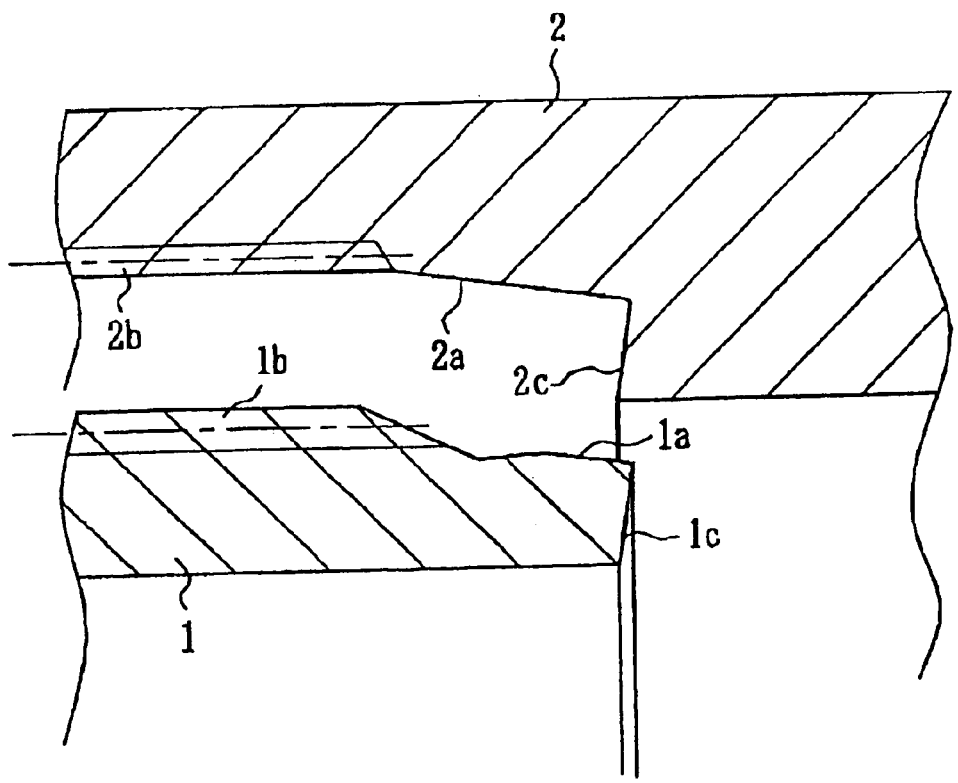
FIG. 2 is an enlarged view showing the vicinity of the metal-to-metal seal portion of the threaded joint.

A steel pipe having a nominal outer diameter of 88.9 mm and a nominal wall thickness of 6.45 mm and made of low carbon steel for oil well pipes (L-80 of API standards) was prepared as a test pipe. As shown in FIGS. 1 and 2, a male thread 1b and an unthreaded sealing surface 1a for providing plane-to-plane contact (a conical unthreaded sealing surface like that proposed in U.S. Pat. No. 5,137,310) were formed by machining on the outer peripheral surface of both ends of the test pipe (at its tip of both ends). The test pipe had a shoulder portion 1c at each end.

A coupling 2 made of the same material as described above for connection to the test pipe 1 had a female thread 2b for threaded engagement with the male thread 1b of the test pipe and an unthreaded sealing surface 2a for abutting against the sealing surface 1a of the test pipe formed on its inner peripheral surface at both of its ends. It had an inner shoulder portion 2c for abutting against the shoulder portion 1c of the steel pipe.

The unthreaded sealing surfaces 1a and 2a of the test pipe 1 and coupling 2 were worked such that the surface roughness Ry of each was approximately 25 μm, which is thought to be the upper limit on the surface roughness Ry applied to a usual threaded joint.

Threaded joints for testing (referred to below as "samples") having a metal-to-metal seal portion were prepared by joining a test pipe 1 to each end of a coupling 2 by threaded engagement as shown in FIG. 1. In this investigation, eight samples A1–A8 were prepared with the amount of interference of the seal portion being set in accordance with the pressure such that the value of the ratio Pm/Py of the average pressure Pm in the annular contact portion (referred to below as the "contact portion") to the internal yield pressure Py (the ratio Pm/Py being referred to below as the "average pressure ratio") varied in increments of approximately 0.5 in the range of 1.0–4.5. These samples were subjected to a seal test, and sealing properties were investigated. The interference of the threads was made zero so that it would have no influence on the seal portion, and threaded engagement was stopped when the shoulders 1c abutted (namely, the amount of threaded engagement of the threads was set by detection of the torque shoulders).

Figure 3:
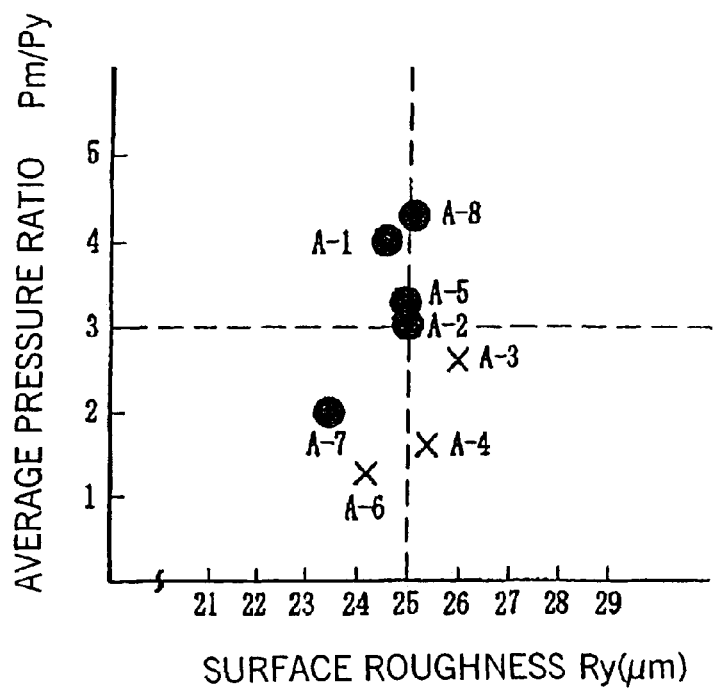
FIG. 3 is a figure showing the average pressure ratio Pm/Py and the results of a seal test for threaded joints for pipes having a surface roughness Ry on the order of 25 μm.

The average pressure ratio Pm/Py which was determined by analysis using the finite element method based on the measured dimensions of each portion of the threaded joint portions and material properties data is shown in Table 1 and FIG. 3 together with the surface roughness of the sealing surfaces, the results of the seal test, and the contact width.

Figure 6:
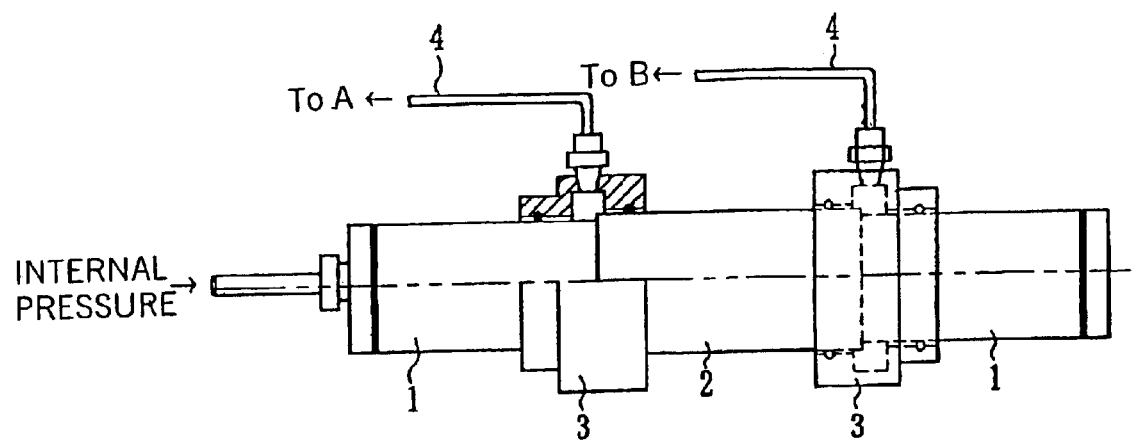
FIG. 6 is a schematic explanatory view showing the method used in a seal test.
Figure 6:
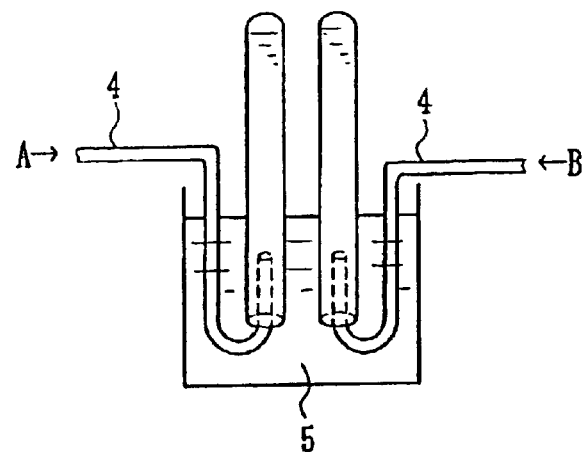

As shown in FIG. 6, the seal test was carried out by maintaining a prescribed internal pressure of nitrogen gas (capped end yield pressure: the Von Mises internal yield pressure Py) for one hour in the interior of a test threaded joint. In order to sense leaks from the threaded joint during the test, as shown in the figure, a collar 3 was provided on the thread end portion at both ends of the coupling 2, leaked gas was led through the collar 3 and a conduit 4 into water 5, and the occurrence of leaks was determined by whether air bubbles were generated.

In the results of the seal test in Table 1, the mark ○ indicates that no leaks developed during one hour of testing, and the mark X indicates that leaks developed. Similarly, in FIG. 3, the mark ● indicates that no leaks developed, and the mark X indicates that leaks developed. As shown in FIG. 1, a threaded joint can be formed at each end of a coupling, and the evaluation was given X if a leak developed from either one.

The surface roughness Ry of a sample shown in Table 1 and FIG. 3 was the measured value of the surface roughness of the sealing surfaces of the pipe and the coupling which were worked to have a surface roughness Ry of 25 μm (measured length: 0.5 mm, the average for the sealing surfaces in a total of 4 locations for the pipe and coupling of the two threaded joints at both ends of the coupling).

The contact width in Table 1 is the width in the axial direction of the portion of the contact portion for which Ps/Py≧1 and was determined together with the average pressure Pm by the finite element method.

Figure 4:
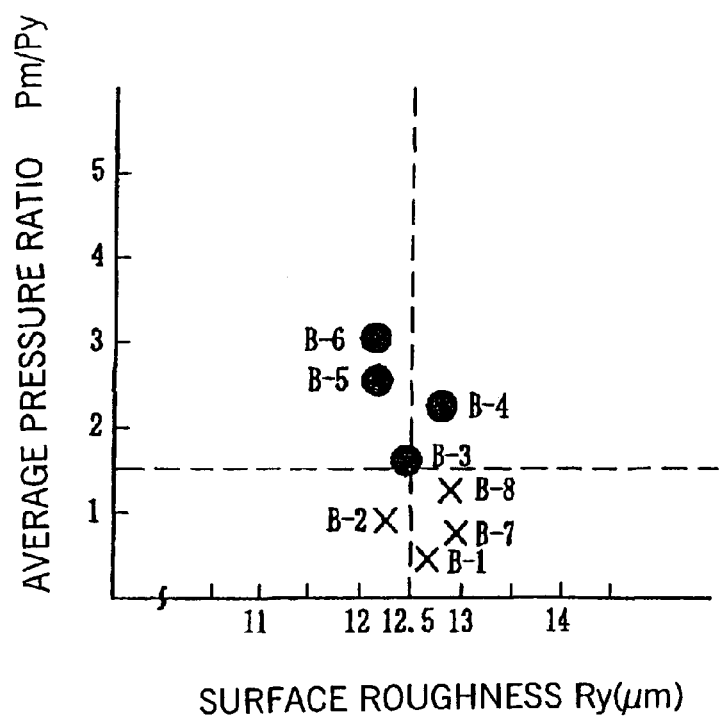
FIG. 4 is a figure showing the average pressure ratio Pm/Py and the results of a seal test for threaded joints for pipes having a surface roughness Ry on the order of 12.5 μm.
Figure 5:
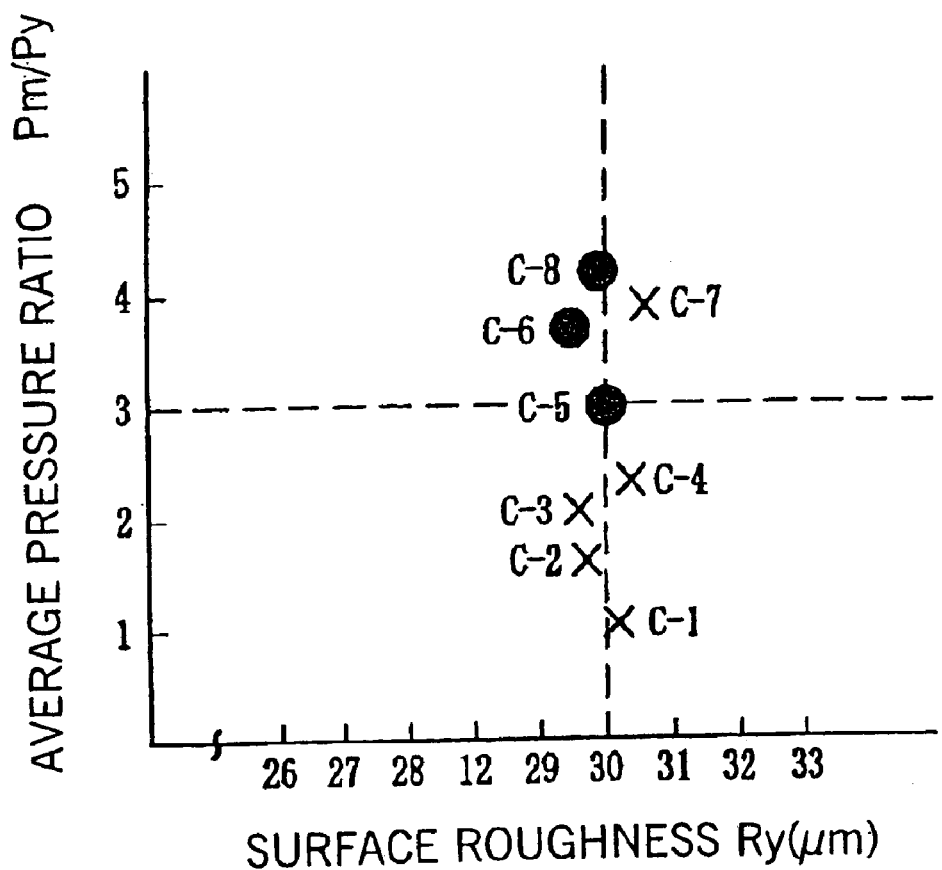
FIG. 5 is a figure showing the average pressure ratio Pm/Py and the results of a seal test for threaded joints for pipes having a surface roughness Ry on the order of 30 μm.

The above-described evaluation method and measurement method were also employed for Tables 2, 3, and 5 and FIGS. 4–5.

TABLE 1

| Sample No. | Surface roughness Ry (μm) | Average pressure ratio Pm/Py | Results of seal test | Contact width* (mm) |
|---|---|---|---|---|
| A-1 | 24.3 | 4.0 | ○ | 1.30 |
| A-2 | 25.1 | 3.2 | ○ | 1.17 |
| A-3 | 25.7 | 2.6 | X | 1.05 |
| A-4 | 25.2 | 1.6 | X | 0.84 |
| A-5 | 24.9 | 3.4 | ○ | 1.21 |
| A-6 | 24.1 | 1.3 | X | 0.77 |
| A-7 | 23.5 | 1.9 | ○ | 0.91 |
| A-8 | 25.2 | 4.3 | ○ | 1.32 |

*Width in the axial direction of the portion of the contact portion for which Ps/Py ≧ 1

From Table 1 and FIG. 3, it can be said that when the surface roughness Ry of the sealing surface of the threaded joint is 25 μm, leaks are not produced if the average pressure ratio Pm/Py is at least 3. It is thought that leaks were not produced with sample A-7 because the surface roughness happened to be the smallest. Of course, it is assumed that leaks are also not produced in the case in which the average pressure ratio Pm/Py is at least 3 and the surface roughness Ry is less than 25 μm.

Accordingly, it can be concluded that leaks are not produced when the average pressure ratio Pm/Py is at least 3 and the surface roughness Ry of the sealing surfaces is at most 25 μm. Similarly, from the results of analysis by the finite element method, it was determined that leaks are not produced when the width in the axial direction of the portion in which the pressure Ps in the contact portion is at least the internal yield pressure Py (i.e., the contact width in Table 1) is generally at least 1.0 mm, as shown in Table 1.

From the above, according to a first mode of the present invention, by making the average pressure ratio Pm/Py in the contact portion at least 3, the width in the axial direction of the portion in which Ps/Py≧1 at least 1 mm, and the average surface roughness of both sealing surfaces at most 25 μm, the sealing properties in the metal-to-metal seal portion can be guaranteed with certainty.

Next, in the same manner as described above except that working was performed such that the surface roughness Ry of the unthreaded sealing surfaces of the pipe and the coupling was 12.5 μm, eight samples B-1 to B-8 were prepared with the amount of interference of the seal portion being set according to the pressure such that the average pressure ratio Pm/Py varied in increments of approximately 0.5 within the range of 0.5–3. These were subjected to the same seal test as described above. The value of the average pressure ratio Pm/Py which was determined by analysis using the finite element method based on the measured dimensions and material properties data of each joint portion are shown together with the results of the seal test, the surface roughness, and the contact width in Table 2 and FIG. 4.

TABLE 2

| Sample No. | Surface roughness Ry (μm) | Average pressure ratio Pm/Py | Results of seal test | Contact width* (mm) |
|---|---|---|---|---|
| B-1 | 12.6 | 0.4 | X | 0.76 |
| B-2 | 12.2 | 0.9 | X | 1.01 |

TABLE 2-continued

| Sample No. | Surface roughness Ry (μm) | Average pressure ratio Pm/Py | Results of seal test | Contact width* (mm) |
|---|---|---|---|---|
| B-3 | 12.4 | 1.6 | ○ | 1.29 |
| B-4 | 12.9 | 2.2 | ○ | 1.48 |
| B-5 | 12.0 | 2.5 | ○ | 1.57 |
| B-6 | 12.1 | 3.1 | ○ | 1.74 |
| B-7 | 12.8 | 0.6 | X | 0.86 |
| B-8 | 13.0 | 1.2 | X | 1.15 |

*Width in the axial direction of the portion of the contact portion for which Ps/Py ≧ 1

From Table 2 and FIG. 4, it can be said that when the surface roughness Ry of the sealing surfaces of a threaded joint is around 12.5 μm, leaks are not produced if the average pressure ratio Pm/Py exceeds 1.5. Of course, it is assumed that leaks are not produced when the surface roughness Ry is less than 12.5 μm if the average pressure ratio Pm/Py is greater than 1.5.

If the surface roughness Ry approaches to the limit of zero, i.e., if it becomes a mirror surface, the sealing surfaces become completely sealed, so as long as an extremely small pressure is guaranteed, leaks are not produced. Namely, as the surface roughness Ry approaches the limit of zero, the value of the average pressure ratio Pm/Py necessary to prevent leaks in the seal portion approaches to the limit of 1.

From the three boundary points (Pm/Py=3, Ry=25 μm), (Pm/Py=1.5, Ry=12.5 μm), and (Pm/Py=1.0, Ry=0) obtained from the experimental results shown in Table 1 and Table 2 and the limit on Ry, a second-order equation using the average pressure Pm/Py and the surface roughness Ry (μm) and describing the boundaries for the presence or absence of leaks is Pm/Py=0.0032×Ry$^2$+1.0.

In a second mode of the present invention, sealing properties can be guaranteed if Pm/Py≧0.0032×Ry$^2$+1.0. However, in this mode as well, the contact width (the width in the axial direction of the portion of the contact portion in which Ps/Py≧1) is made at least 1.0 mm.

In the above equation which describes conditions, the average pressure ratio Pm/Py is used as an index because the average pressure Pm indicates the pressing force on the sealing surface per unit length or unit area, and when the force pressurizing surfaces having a surface roughness against each other is large, gaps between the contact surfaces which are produced by the surface roughness are squashed and decrease, and it is thought that the sealing properties of the sealing surfaces improve.

Next, in the same manner as described above except that working was performed such that the surface roughness Ry of the unthreaded sealing surfaces was a larger value (approximately 30 μm), eight samples C-1 to C-8 were prepared with the amount of interference of the seal portion being set according to the pressure such that the average pressure ratio Pm/Py varied in increments of approximately 0.5 within the range of 1.0–4.5, and these were subjected to the seal test as described above. The value of the average pressure ratio Pm/Py which was determined by analysis using the finite element method based on the measured dimensions and material properties data of each joint portion is shown together with the results of the seal test, the surface roughness, and the contact width in Table 3 and FIG. 5.

TABLE 3

| Sample No. | Surface roughness Ry (μm) | Average pressure ratio Pm/Py | Results of seal test | Contact width* (mm) |
|---|---|---|---|---|
| C-1 | 30.2 | 1.1 | X | 1.63 |
| C-2 | 29.7 | 1.7 | X | 1.80 |
| C-3 | 29.9 | 2.1 | X | 1.91 |
| C-4 | 30.5 | 2.4 | X | 2.07 |
| C-5 | 30.1 | 2.9 | ○ | 2.11 |
| C-6 | 29.6 | 3.6 | ○ | 2.13 |
| C-7 | 30.7 | 3.8 | X | 1.27 |
| C-8 | 29.5 | 4.2 | ○ | 2.21 |

*Width in the axial direction of the portion of the contact portion for which Ps/Py ≧ 1

From Table 3 and FIG. 5, it can be seen that in the case the surface roughness Ry of the sealing surfaces is up to 30 μm, according to the third mode of the present invention, if the width in the axial direction of the contact portion of the portion which receives a pressure Ps of at least the internal yield pressure Py (in which Ps/Py≧1) is at least 2 mm and the average pressure ratio Pm/Py is at least 3, the sealing properties can be guaranteed with certainty.

However, even with a threaded joint for pipes according to any of the above modes of the present invention, it becomes easy for seizing to occur if the average pressure ratio Pm/Py becomes too large. The upper limit on Pm/Py such that seizing does not occur depends upon the material and whether pretreatment is carried out, but in general, the value of Pm/Py is preferably at most 5, and more preferably it is at most 4.5. In order to prevent seizing, it is advantageous to set the average pressure ratio Pm/Py close to the lower limit prescribed by the present invention. By doing so, even with a material or conditions with which seizing easily takes place, there is a good possibility of preventing seizing with certainty.

In any case, as for the pressure Ps, from the standpoint of seizing resistance, it is preferred that the pressure Ps not exceed the yield point Ys of the material (Ps/Ys<1).

Depending upon the material forming the threaded joint and the make-up conditions, an appropriate surface treatment can be performed on both the threads and the unthreaded sealing surfaces in order to impart seizing resistance. Some examples of such surface treatment are phosphate treatment, solid lubricant treatment, plating, and blasting zinc-based plating. The surface treatment can be performed on the threads and the unthreaded sealing surfaces of either one or both of the steel pipe and the coupling. A suitable grease or oil is usually applied to a threaded joint before make-up, but depending upon the surface treatment, such application may not be necessary.

The shape of the metal-to-metal seal portion of a threaded joint for pipes according to the present invention can be a shape in which the sealing surfaces formed on the end portion of the steel pipe and on the coupling are both conical surfaces, or a shape in which one is a curved surface and the other is a conical surface, a shape in which both are curved surfaces, or the like. However, taking into consideration deformation of the end of the pipe or of the coupling due to threaded engagement of the seal portion, it is necessary to satisfy the above-described condition on the width in the axial direction of the portion of the contact portion in which Ps/Py≧1.

EXAMPLES

Using test pipes and couplings having the same dimensions and of the same materials as previously described, various threaded joints for testing (samples) were prepared, and the sealing properties were investigated by the same seal test as previously described.

Each sample was prepared such that the average pressure ratio Pm/Py and the surface roughness Ry of the unthreaded sealing surfaces 1a and 2a of the test pipe and coupling, respectively, had the values shown in Table 4. The amount of interference of the threads was made zero so that it would have no influence on the seal portion, and tightening was stopped when the shoulder 1c abutted.

As shown in FIG. 1, the sample had two test pipes 1 each having a male thread 1b and an unthreaded sealing surface 1a formed on the outer peripheral surface of its end disposed at both ends of a coupling 2 having a female thread 2b and an unthreaded sealing surface 2a formed on its inner peripheral surface at both ends. Accordingly, each sample had two threaded joint portions, and the identifying number was made 1-A and 1-B, for example (the threaded joint on side A and on side B for sample No. 1).

As shown in Table 4, with some samples, the surface roughness Ry of the sealing surfaces of two threaded joints A and B of the same sample were different from each other. However, the worked values of the surface roughness Ry of the sealing surfaces of the pipes and the coupling in a single threaded joint were the same. The average of the measured values of the surface roughness of the pipe and the coupling for each joint is shown in Table 5.

On each sample prepared, a seal test in which an internal pressure (capped end yield pressure: Von Mises internal yield pressure Py) was maintained for one hour was performed in the above-described manner to ascertain the sealing properties. The results are shown in Table 5 and FIG. 7 together with working results of the test pipes.

Figure 7:
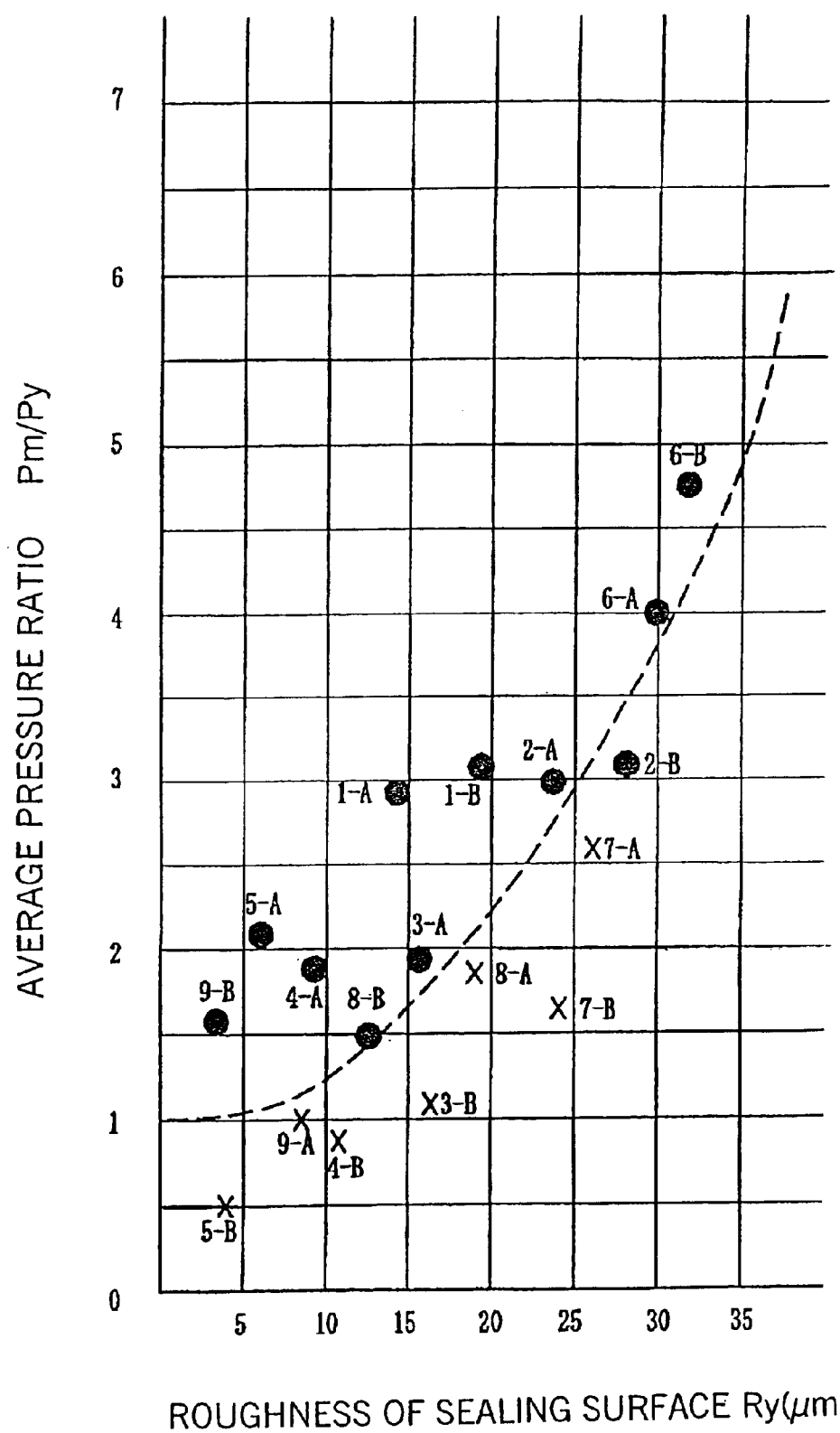
FIG. 7 is a figure showing the results of the seal test as the relationship between the average pressure ratio Pm/Py and the surface roughness Ry.

In Table 5 and FIG. 7, the results of seal test affixed with an * indicated that seizing occurred when the joint was loosened after the seal test. The "corresponding mode number" in Table 5 means the number of one of the above-described modes of the present invention.

FIG. 7 is a graph plotting the average pressure ratio Pm/Py on the ordinate and the surface roughness Ry of the sealing surfaces on the abscissa. The curve shown by the dashed line in the figure indicates $Pm/Py = 0.0032 \times Ry^2 + 1.0$.

TABLE 4

| Sample ID. No. | Surface roughness Ry ($\mu$m) | Average pressure ratio Pm/Py |
|---|---|---|
| 1-A | 15 | 3 |
| 1-B | 20 | 3 |
| 2-A | 25 | 3 |
| 2-B | 30 | 3 |
| 3-A | 15 | 2 |
| 3-B | 15 | 1 |
| 4-A | 10 | 2 |
| 4-B | 10 | 1 |
| 5-A | 5 | 2 |
| 5-B | 5 | 0.5 |
| 6-A | 30 | 4 |
| 6-B | 30 | 5 |
| 7-A | 25 | 2.5 |
| 7-B | 25 | 1.5 |
| 8-A | 20 | 2 |
| 8-B | 12.5 | 1.5 |
| 9-A | 7.5 | 1 |
| 9-B | 3 | 1.5 |

TABLE 5

| Sample ID. No. | Surface roughness Ry ($\mu$m) | Average pressure ratio Pm/Py | $0.0032 \times Ry^2 + 1$ | Results of seal test | Contact width[1] (mm) | Corresponding mode number |
|---|---|---|---|---|---|---|
| 1-A | 14 | 2.9 | 1.63 | ○ | 1.68 | (2) |
| 1-B | 19.5 | 3.1 | 2.22 | ○ | 1.11 | (1) |
| 2-A | 24 | 3.0 | 2.84 | ○ | 1.13 | (1) |
| 2-B | 28.5 | 3.1 | 3.60 | ○ | 2.10 | (3) |
| 3-A | 15.5 | 1.9 | 1.77 | ○ | 1.35 | (2) |
| 3-B | 16 | 1.1 | 1.82 | X | 1.10 | comparative |
| 4-A | 9 | 1.9 | 1.26 | ○ | 1.40 | (2) |
| 4-B | 11 | 0.9 | 1.39 | X | 1.00 | comparative |
| 5-A | 6 | 2.1 | 1.12 | ○ | 1.51 | (2) |
| 5-B | 4 | 0.5 | 1.05 | X‡ | 0.80 | comparative |
| 6-A | 30 | 4.0 | 3.88 | ○ | 2.20 | (3), (2) |
| 6-B | 32 | 5.2 | 4.28 | ○‡ | 2.31 | (2) |
| 7-A | 26 | 2.6 | 3.16 | X | 1.04 | comparative |
| 7-B | 24 | 1.7 | 2.84 | X | 0.86 | comparative |
| 8-A | 19.5 | 1.8 | 2.22 | X | 0.89 | comparative |
| 8-B | 12.5 | 1.5 | 1.50 | ○ | 1.24 | (2) |
| 9-A | 8 | 1.0 | 1.20 | X | 1.06 | comparative |
| 9-B | 3 | 1.6 | 1.03 | ○‡ | 1.30 | (2) |

‡Seizing occurs during loosening
[1]Width in the axial direction of the portion of the contact portion for which Ps/Py ≧ 1

From FIG. 7 and Table 5, it was confirmed that with threaded joint samples satisfying any of the conditions of the present invention (i.e., the samples of Table 5 other than the comparative examples), good sealing properties can be guaranteed. On the other hand, the threaded joint samples of the comparative examples which did not satisfy any of the conditions of the present invention all generated leaks.

Seizure occurred with Sample ID. No. 9-B in spite of a small average pressure ratio Pm/Py of 1.6 because the surface roughness was very small (3 $\mu$m).

According to the present invention, without making the surface roughness of the sealing surface unreasonably small and thus prolonging machining time or increasing working costs or going to the trouble of repeating trial and error to find a compromise point between cost and sealing properties, the smallest necessary surface roughness can be determined for a pressure which is applied taking into consideration seizing resistance, and a more rational and economical threaded joint having a metal-to-metal seal can be obtained.

What is claimed is:

1. A threaded joint for pipes having a metal-to-metal seal portion and comprising a male thread and an unthreaded sealing surface formed on an end of a steel pipe, and a female thread and an unthreaded sealing surface formed on the inner surface of a coupling, the female thread threadingly engaging with the male thread and the unthreaded sealing surface of the coupling abutting against the sealing surface of the steel pipe and forming an annular contact portion, characterized in that the surface roughness Ry of the unthreaded sealing surfaces of the steel pipe and the coupling is at most 25 $\mu$m, and upon make-up of the threaded joint, a metal-to-metal seal portion can be formed in which the average pressure Pm of the annular contact portion satisfies Pm/Py≧3, and the width in the axial direction of the portion which receives a pressure Ps which satisfies Ps/Py≧1 in the annular contact portion is at least 1 mm, with the yield pressure of the inner surface of the pipe being Py.

2. A threaded joint for pipes as described in claim 1 wherein an end surface of the steel pipe has a shoulder portion, and correspondingly the coupling also has a shoulder portion capable of abutting against the shoulder portion of the steel pipe.

3. A threaded joint for pipes having a metal-to-metal seal portion and comprising a male thread and an unthreaded sealing surface formed on an end of a steel pipe, and a female thread and an unthreaded sealing surface formed on the inner surface of a coupling, the female thread threadingly engaging with the male thread and the unthreaded sealing surface of the coupling abutting against the sealing surface of the steel pipe and forming an annular contact portion, characterized in that upon make-up of the threaded joint, for the unthreaded sealing surfaces of both the steel pipe and the coupling, the relationship between the average pressure Pm of the annular contact portion and the surface roughness Ry ($\mu$m) satisfies $Pm/Py \geq 0.0032 \times Ry^2 + 1.0$, and the width in the axial direction of the portion which receives a pressure Ps which satisfies $Ps/Py \geq 1$ in the annular contact portion is at least 1 mm, with the yield pressure of the inner surface of the pipe being Py.

4. A threaded joint for pipes as described in claim 3 wherein an end surface of the steel pipe has a shoulder portion, and correspondingly the coupling also has a shoulder portion capable of abutting against the shoulder portion of the steel pipe.

5. A threaded joint for pipes having a metal-to-metal seal portion and comprising a male thread and an unthreaded sealing surface formed on an end of a steel pipe, and a female thread and an unthreaded sealing surface formed on the inner surface of a coupling, the female thread threadingly engaging with the male thread and the unthreaded sealing surface of the coupling abutting against the sealing surface of the steel pipe and forming an annular contact portion, characterized in that the surface roughness Ry of the unthreaded sealing surfaces of the steel pipe and the coupling is at most 30 $\mu$m, and upon make-up of the threaded joint, the average pressure Pm of the annular contact portion satisfies $Pm/Py \geq 3$, and the width in the axial direction of the portion which receives a pressure Ps which satisfies $Ps/Py \geq 1$ in the annular contact portion is at least 2 mm, with the yield pressure of the inner surface of the pipe being Py.

6. A threaded joint for pipes as described in claim 5 wherein an end surface of the steel pipe has a shoulder portion, and correspondingly the coupling also has a shoulder portion capable of abutting against the shoulder portion of the steel pipe.

* * * * *